H. E. HEATH.
ELECTROSTATIC VOLTMETER.
APPLICATION FILED JULY 6, 1908.
993,062.
Patented May 23, 1911.
Fig. 1.
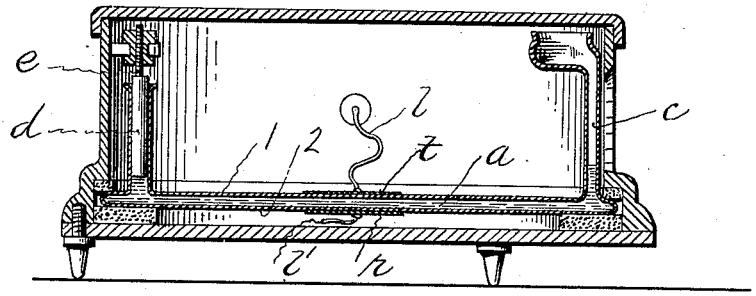
Fig. 2.
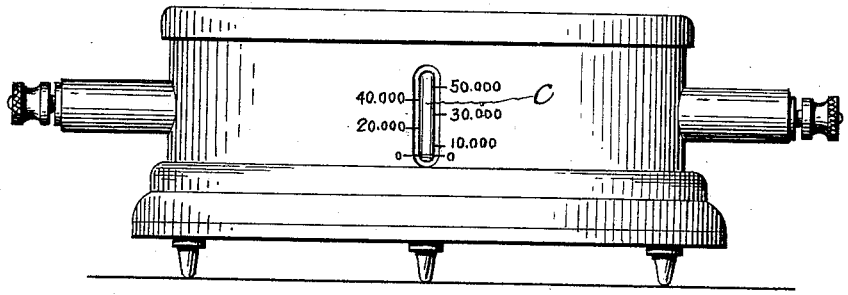
Fig. 3.
Fig. 4.
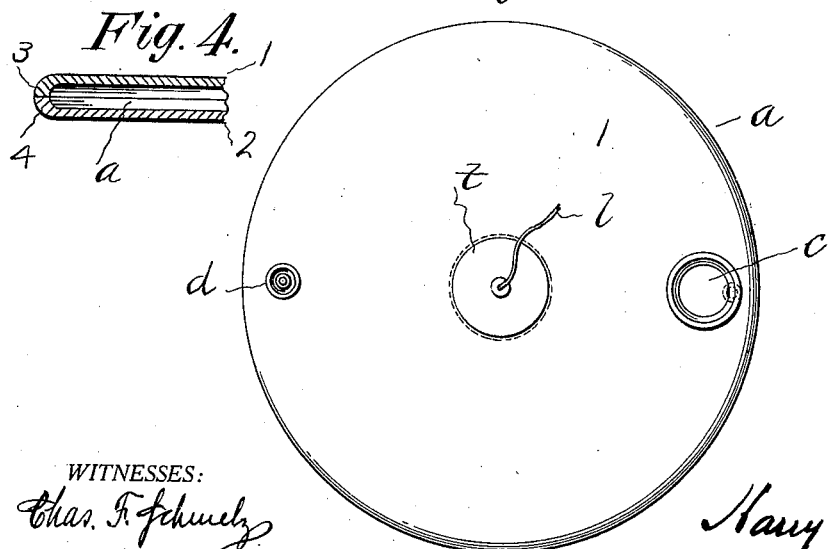
WITNESSES:
INVENTOR.
Harry E. Heath
BY
ATTORNEY.

UNITED STATES PATENT OFFICE.

HARRY E. HEATH, OF HARTFORD, CONNECTICUT, ASSIGNOR TO THE BAKER ELECTRIC COMPANY, OF HARTFORD, CONNECTICUT, A CORPORATION OF CONNECTICUT.

ELECTROSTATIC VOLTMETER.

993,062. Specification of Letters Patent. Patented May 23, 1911.

Application filed July 6, 1908. Serial No. 442,012.

*To all whom it may concern:*

Be it known that I, HARRY E. HEATH, a citizen of the United States, and a resident of Hartford, in the county of Hartford and State of Connecticut, have invented certain new and useful Improvements in Electrostatic Voltmeters, of which the following is a specification.

The object of this invention is to produce an instrument for measuring differences of electrical potential and especially one which will measure very high voltages, for instance, up to at least 50,000 volts.

In the drawings—Figure 1 is a general side view of a finished instrument. Fig. 2 is a side view of an instrument with the case removed. Fig. 3 is a plan view of the same. Fig. 4 is a sectional side elevation of a part of the chamber.

Referring to the drawings, in which one embodiment of my invention is illustrated, $a$ denotes a chamber made by taking two disks 1, 2, of insulating material such as glass and separating them slightly by any desired spacing device at their edges and sealing the joint. I have shown the disks as provided with rims 3, 4, which are butted and either fused together or cemented or sealed in any desired manner.

A graduated tube $c$ is connected with the chamber at one side and opposite the graduated tube is a regulating tube $d$ connected with the chamber and having in its end an adjustable plug $e$. The chamber is filled with a di-electric substance which normally stands as a column in the graduated tube at the zero point. At present I prefer to use a fluid such as petroleum, and to aid in taking the readings this fluid may be colored as by the addition of anilin dyes. By means of the adjustable plug $e$ the column in the graduated tube can always be adjusted so that normally it will stand at the zero point.

At the center of each disk is located a terminal plate, $t$ indicating the one on the upper disk and $r$ the one on the lower disk. As illustrated these terminal plates are on the outside of each disk and one of the leads $l$ from the apparatus to be tested is connected to one plate, as $t$, and the other lead $l'$ to the other plate $r$. When connected in this way the two plates are attached to one another when the device is in use and so create a pressure which will spring these disks 1, 2, toward each other, diminishing the size of the chamber and forcing the column up in the graduated tube $c$. The pressure between these terminal plates can be readily calculated for various differences in potential and the tube can be graduated so that the rise or fall of the column will indicate the voltage or difference of potential between the terminal plates. The commercial way would probably be to graduate these tubes by comparison with a fixed standard.

If desired one of the leads from the apparatus to be tested may be connected to both of the terminal plates, the other lead being grounded. Under these conditions the plates will repel one another, thus causing the disks to spring apart slightly, increasing the capacity of the chamber $a$ and causing the column to drop in the tube. In this case the zero point is at the top of the tube, but otherwise the operation of the device is as above described.

I am aware that various substances can be used in place of those described and that alterations may be made in the details of construction without departing from the broad scope of my invention.

I claim as my invention:

1. An electro-static voltmeter comprising the combination with a pair of terminal plates arranged in operative relation to each other, of elastic insulating material located between said terminal plates and extending beyond the edges thereof in all directions and an indicator connected with and operated by the movement of said elastic insulating material.

2. An electro-static voltmeter comprising the combination with a pair of terminal plates arranged side by side in operative relation to each other, of elastic insulating material located between said plates and extending for a substantial distance beyond the edges thereof in all directions and an indicator connected with and operated by the movement of said elastic insulating material.

3. An electro-static voltmeter comprising a pair of terminal plates arranged side by side in operative relation to one another, a disk of insulating material secured to each terminal, the edges of said disks being connected to form a chamber, a di-electric substance in said chamber, and an indicator actuated by said di-electric substance.

4. An electro-static voltmeter comprising the combination with a pair of terminal plates arranged side by side in operative relation to one another, a disk of insulating material secured to each terminal plate, the edges of said disks being connected together to form a chamber, a di-electric substance in said chamber, a graduated tube in communication with said chamber whereby the changes in capacity of said chamber due to the stress between said terminals may be indicated by the rise and fall of said di-electric substance in said tube.

5. An electro-static voltmeter comprising a pair of terminal plates arranged side by side in operative relation to one another, a disk of insulating material secured to each terminal, means for connecting the edges of said disks to form a chamber, a di-electric substance in said chamber, a graduated tube in communication with said chamber, a regulating tube in communication with said chamber, and an adjustable plug in said regulating tube, as and for the purposes described.

HARRY E. HEATH.

Witnesses:
H. E. HART,
D. I. KREIMENDAHL.

---

Copies of this patent may be obtained for five cents each, by addressing the "Commissioner of Patents, Washington, D. C."